United States Patent
Duxbury (10) Patent No.: US 7,769,788 B2
(45) Date of Patent: Aug. 3, 2010

(54) AHO-CORASICK METHODOLOGY FOR STRING SEARCHING

(75) Inventor: Neil Duxbury, Westbury (GB)

(73) Assignee: Roke Manor Research Limited, Romsey (GB)

( * ) Notice: Subject to any disclaimer, the term of this patent is extended or adjusted under 35 U.S.C. 154(b) by 631 days.

(21) Appl. No.: 11/783,201

(22) Filed: Apr. 6, 2007

(65) Prior Publication Data

US 2007/0282835 A1    Dec. 6, 2007

(30) Foreign Application Priority Data

Apr. 28, 2006   (GB) .................................. 0608420.6

(51) Int. Cl.
  *G06F 7/00*   (2006.01)
  *G06F 17/30*  (2006.01)
(52) U.S. Cl. .................................................... 707/803
(58) Field of Classification Search ................ 707/6, 707/803, 999.006
    See application file for complete search history.

(56) References Cited

U.S. PATENT DOCUMENTS

| | | | | |
|---|---|---|---|---|
| 5,963,942 A * | 10/1999 | Igata | .................................. | 1/1 |
| 7,089,227 B2 * | 8/2006 | Abe et al. | ............................ | 1/1 |
| 7,539,681 B2 * | 5/2009 | Norton et al. | ........................ | 1/1 |
| 2007/0055766 A1 * | 3/2007 | Petropoulakis et al. | ....... | 709/224 |
| 2007/0124146 A1 * | 5/2007 | Lunteren | ..................... | 704/255 |
| 2007/0233628 A1 * | 10/2007 | Sherwood et al. | .............. | 706/46 |

FOREIGN PATENT DOCUMENTS

WO   WO 2004/097643 A2   11/2004

OTHER PUBLICATIONS

Alfred V. Aho et al. "Efficient String Matching: An Aid to Bibliographic Search", Communication of AMC, Inc., Jun. 1975, vol. 18, No. 6, pp. 333-340.
Pekka Kilpelaeinen "Biosequence Algorithms, Spring 2005 Lecture 4: Set Matching and Aho-Corasick Algorithm", University of Kuopio, Department of Computer Science, pp. 1-24, <http://www.cs.uku.fi/~kilpelai/BSA05/lectures/slides04.pdf>.
Shiri Dori et al. "Construction of Aho Corasick automaton in Linear time for Integer Alphabets", University of Haifa, <http://www.cs.ucr.edu/~stelo/cpm05/cpm05_4_5_Dori.ppt#16>.
United Kindom Search Report dated Jun. 29, 2006, (One (1) Page).

* cited by examiner

*Primary Examiner*—John E Breene
*Assistant Examiner*—Aleksandr Kerzhner
(74) *Attorney, Agent, or Firm*—Crowell & Moring LLP (57) ABSTRACT

In a method of constructing an Aho-Corasick tree, tree is constructed in a general depth first manner, one string at a time. Preferably during the construction of the string, after each node is added, failure links or extended failure links from that node to other nodes are added and failure links to nodes in the newly inserted branch are re-updated.

6 Claims, 11 Drawing Sheets

FIG 1A  Goto function (Prior Art)

FIG 1B  Failure function (Prior Art)

FIG 1C  Output function (Prior Art)

FIG 3  Next move function.

| | input symbol | next state |
|---|---|---|
| state 0: | h | 1 |
| | s | 3 |
| | . | 0 |
| state 1: | e | 2 |
| | i | 6 |
| | h | 1 |
| | s | 3 |
| | . | 0 |
| state 9: state 7: state 3: | h | 4 |
| | s | 3 |
| | . | 0 |
| state 5: state 2: | r | 8 |
| | h | 1 |
| | s | 3 |
| | . | 0 |
| state 6: | s | 7 |
| | h | 1 |
| | . | 0 |
| state 4: | e | 5 |
| | i | 6 |
| | h | 1 |
| | s | 3 |
| | . | 0 |
| state 8: | s | 9 |
| | h | 1 |
| | . | 0 |

FIG 5C
add s'

FIG 5B
b(4, B)=null

FIG 5A

FIG 5E
set edge to s'

FIG 5F
set failure link for s'

FIG 5G
correct corruption

FIG 6A
b(4, B)=null

FIG 6B
add s'

FIG 6C
add edge to ? and set label to B

FIG 6D
set edge to s'

FIG 6E
set failure link for s'

FIG 6F
correct corruption

FIG 7A

Automaton after insertion of ABA into existing automaton containing BAB

FIG 7B

Suffix trie for BAB

FIG 8A

Automaton after insertion of ABA into existing automaton containing BAB

FIG 8B

Edge index for BAB

AHO-CORASICK METHODOLOGY FOR STRING SEARCHING

The present invention is directed to a method for constructing an Aho-Corasick tree for Information Retrieval and Text Editing.

BACKGROUND OF THE INVENTION

In many information retrieval and text-editing applications it is necessary to be able to locate quickly some or all occurrences of user-specified patterns of words and phrases in text. The paper entitled "Efficient String Matching: An Aid to Bibliographic Search" by Alfred V. Aho and Margaret J. Corasick, Bell Laboratories describes a simple, efficient algorithm to locate all occurrences of any of a finite number of keywords in a string of text. The algorithm consists of constructing a finite state pattern matching machine to process the text string in a single pass. Construction of the pattern matching machine takes time proportional to the sum of the lengths of the keywords. The number of state transitions made by the pattern matching machine in processing the text string is independent of the number of keywords. The algorithm consists of two parts. In the first part we construct from the set of keywords a finite state pattern matching machine; in the second part we apply the text string as input to the pattern matching machine. The machine signals whenever it has found a match for a keyword.

The prior art Aho Corasick methodology will now be described as background.

A string is simply a finite sequence of characters. Let $K=(y_1, y_2, \ldots, y_k)$ be a finite set of strings which we shall call keywords and let x be an arbitrary string which we shall call the text string. Our problem is to locate and identify all substrings of x which are keywords in K. Substrings may overlap with one another. A pattern matching machine for K is a program which takes as input the text sting x and produces as output the locations in x at which keywords of K appear as substrings. The pattern matching machine consists of a set of states or nodes. Each state is represented by a number. The machine processes the text string x by successively reading the characters in x, making state transitions and occasionally emitting output. The behaviour of the pattern matching machine is dictated by three functions: a goto function g, a failure function f, and an output function output. FIG. 1 shows the functions used by a pattern matching machine for the set of keywords {he, she, his, hers}.

Figure 1A:
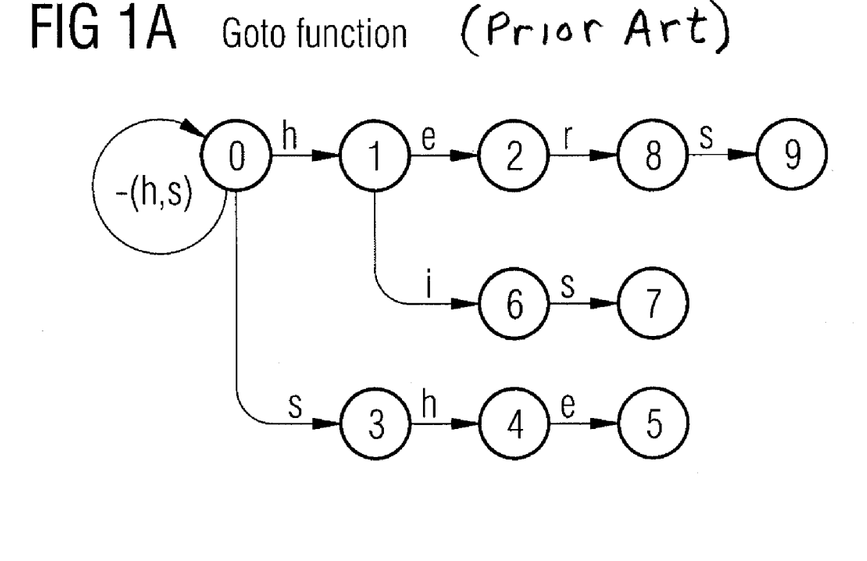
FIG. 1 shows functions used by a machine M to process a text string, "ushers"
Figure 1B:
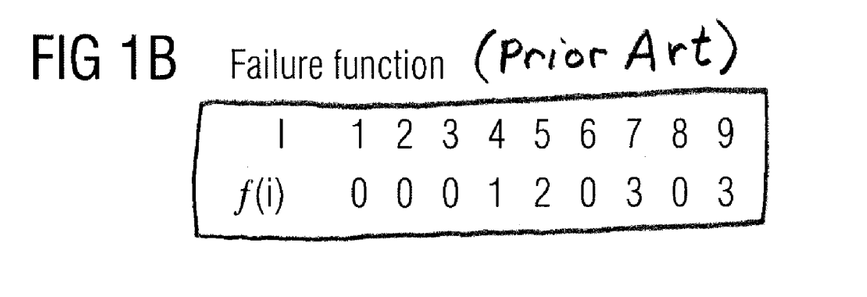

In the prior art technique, state (usually 0) is designated as a start or root node. In FIG. 1 example, the nodes are 0, 1, . . . ,9. The goto function g maps a pair consisting of a state and an input character into a node or the message fail. The directed graph in FIG. 1(*a*) represents the goto function. For example, the edge labeled h from 0 to 1 indicates that g (0,h)=1. The absence of an arrow indicates fail. Thus, g (1,σ)=fail for all input characters σ that are not e or i. All our pattern matching machines have the property that g(0, σ)≠fail for all input characters σ. We shall see that this property of the goto function on state 0 ensures that one input character will be processed by the machine every machine cycle.

The failure function f maps a node into a node. The failure function is consulted whenever the goto function reports fail. Certain nodes are designated as output nodes which indicate that a set of keywords has been found. The output function formalizes this concept by associating a set of keywords (possibly entry) with every node.

An operating cycle of a pattern matching machine is defined as follows. Let s be the current node of the machine and a the current character of the input string x.

1. If g (s,a)=s', the machine makes a goto transition. It enters state s', and the next character of x becomes the current input character. In addition, if output (s')≠empty, then the machine emits the set output (s') along with the position of the current input character. The operating cycle is now complete.

2. If g (s,a)=fail, the machine consults the failure function f and is said to make a failure transmission. If f(s)=s', the machine repeats the cycle with s' as the current node and a as the current input.

Initially, the current state of the machine is the start state and the first character of the text string is the current input character. The machine then processes the text string by making one operating cycle on each character of the text string. For example, consider the behaviour of the machine M that uses the functions in FIG. 1 to process the text string "ushers." FIG. 2 indicates the state transitions made by M in processing the text string.

TABLE 1

Sequence of node transitions.

| u s h e r s |
|---|
| 0 0 3 4 5 8 9 |

Consider the operating cycle when M is in state 4 and the current input character is e. Since g(4,e)=5, the machine enters state 5, advances to the next input character and emits output (5), indicating that it has found the keywords "she" and "he" at the end of position four in the text string. In state 5 on input character r, the machine makes two node transitions in its operating cycle. Since g(l5,r)=fail, M enters node 2=f(5). Then since g(2,r)=8, M enters node 8 and advances to the next input character. No output is generated in this operating cycle.

We say that the three functions g, f, and output are valid for a set of keywords if with these functions Algorithm 1 indicates that keyword y ends at position i of text string x if and only if x=uyv and the length of uy is i.

We shall now show how to construct valid goto, failure and output functions from a set of keywords. There are two parts to the construction. In the first part we determine the states and the "goto" function. In the second part we compute the failure function. The computation of the output function is begun in the first part of the construction and completed in the second part.

To construct the "goto" function, we shall construct a gala graph. We begin with a graph consisting of one vertex which represents the state 0. We then enter each keyword y into the graph, by adding a directed path to the graph that begins at the start state. New vertices and edges are added to the graph so that there will be, starting at the start state, a path in the graph that spells out the keyword y. The keyword y is added to the output function of the state at which the path terminates. We add new edges to the graph only when necessary.

For example, suppose {he, she, his, hers} is the set of keywords. Adding the first keyword to the graph, we obtain the trie of FIG. 2*a*. The path from state 0 to state 2 spells out the keyword "he"; we associate the output "he" with state 2. Adding the second keyword "she," we obtain FIG. 2*b*. The output "she" is associated with state 5. Adding the keyword "his," we obtain FIG. 2*c*. Notice that when we add the keyword "his" there is already an I edge labeled h from state 0 to state 1, so we do not need to add another edge labeled h from state 0 to state 1. The output "his" is associated with state 7.

Figure 2A:
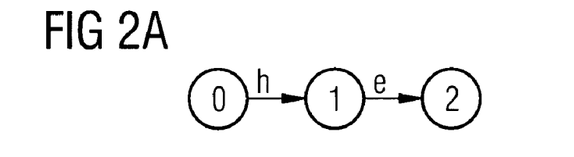
FIG. 2 shows state transitions made by the machine M in processing a text string.
Figure 2B:
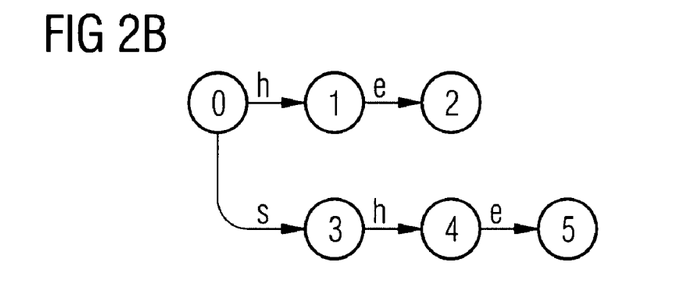
Figure 2C:
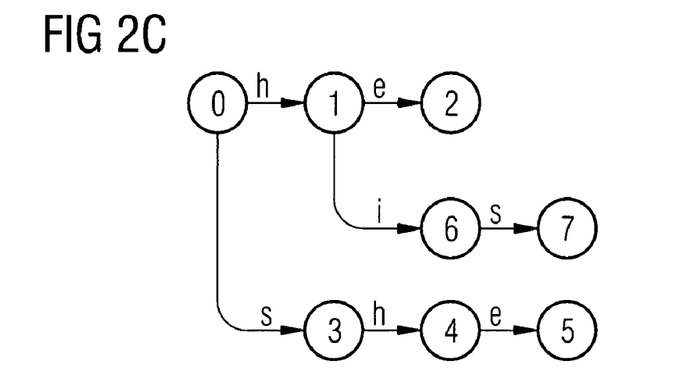
Figure 2D:
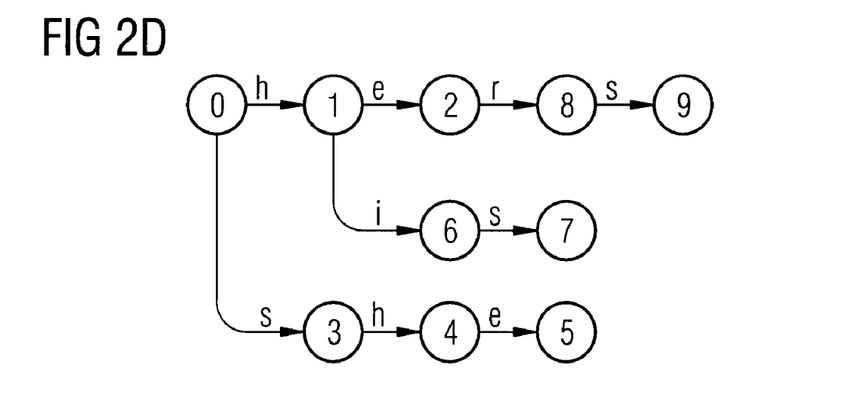

Adding the last keyword "hers," we obtain FIG. 2d. The output "hers" is associated with state 9. Here we have been able to use the existing edge labeled h from state 0 to I and the existing edge labeled e from state 1 to 2. Up to this point the graph is a rooted directed tree. To complete the construction of the goto function we add a loop from state 0 to state 0 on all input characters other than h or s. We obtain the directed graph shown in FIG. I(a). This graph represents the goto function.

The failure function is constructed from the goto function. Let us define the depth of a state s in the goto graph as the length of the shortest path from the start state to s. Thus in FIG. 1(a), the start state is of depth 0, states I and 3 are of depth 1, states 2, 4, and 6 are of depth 2, and so on. We shall compute the failure function for all states of depth I, then for all states of depth 2, and so on, until the failure function has been computed for all states (except state 0 for which the failure function is not defined). The algorithm to compute the failure function f at a state is conceptually quite simple. We make f(s)=0 for all states s of depth 1. Now suppose f has been computed for all states of depth less than d. The failure function for the states of depth d is computed from the failure function for the states of depth less than d. The states of depth d can be determined from the non fail values of the goto function of the states of depth d-1.

Specifically, to compute the failure function for the nodes of depth d, we consider each node r of depth d−1 and perform the following actions.
1. If g(r.a)=fail for all a, do nothing.
2. Otherwise, for each character a such that g(r.a)=s, do the following:
    (a) Set node=f(r).
    (b) Execute the statement node—f(node) zero or more times, until a value for node is obtained such that g(node, a)≠fail. (Note that since g(0,a)≠fail for all a, such a node will always be found.)
    (c) Set f(s)=g (node, a).

For example, to compute the failure function from FIG. 1(a), we would first set f(1)=f(3)=0 since 1 and 3 are the nodes of depth 1. We then compute the failure function fro 2, 6 and 4, the nodes of depth 2. To compute f(2), we set node=f(1)=0; and since g(0, e)=0, we find that f(2)=0. To compute f(6), we set node node=f(1)=0; and since g(0, i)=0, we find that f(6)=0. To compute f(4), we set node=f(3)=0; and since g(0, h)=1, we find that f(4)=1. Continuing in we obtain the failure function shown in FIG. 1(b).

Figure 1C:
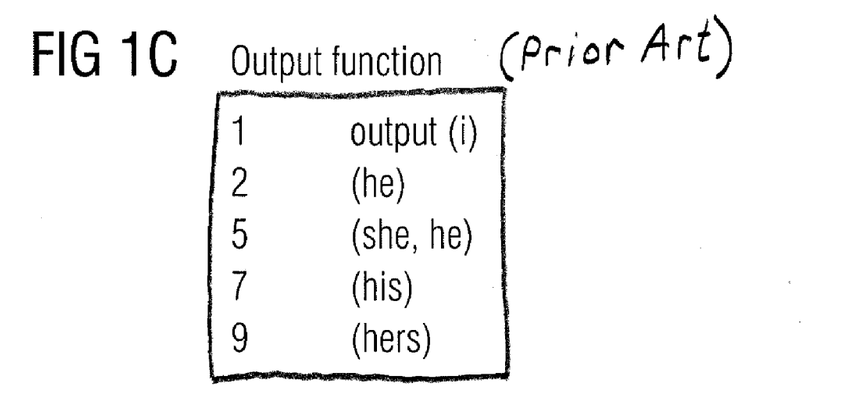

During the computation of the failure function we also update the output function. When we determine f(s)=s', we merge the outputs of node s with the output of node s'. For example, from FIG. 1(a) we determine f(5)=2. At this point we merge the output set of state 2, namely {he}, with the output set of node 5 to derive the new output set {he, she}. The final nonempty output sets are shown in FIG. 1(c).

Figure 3:
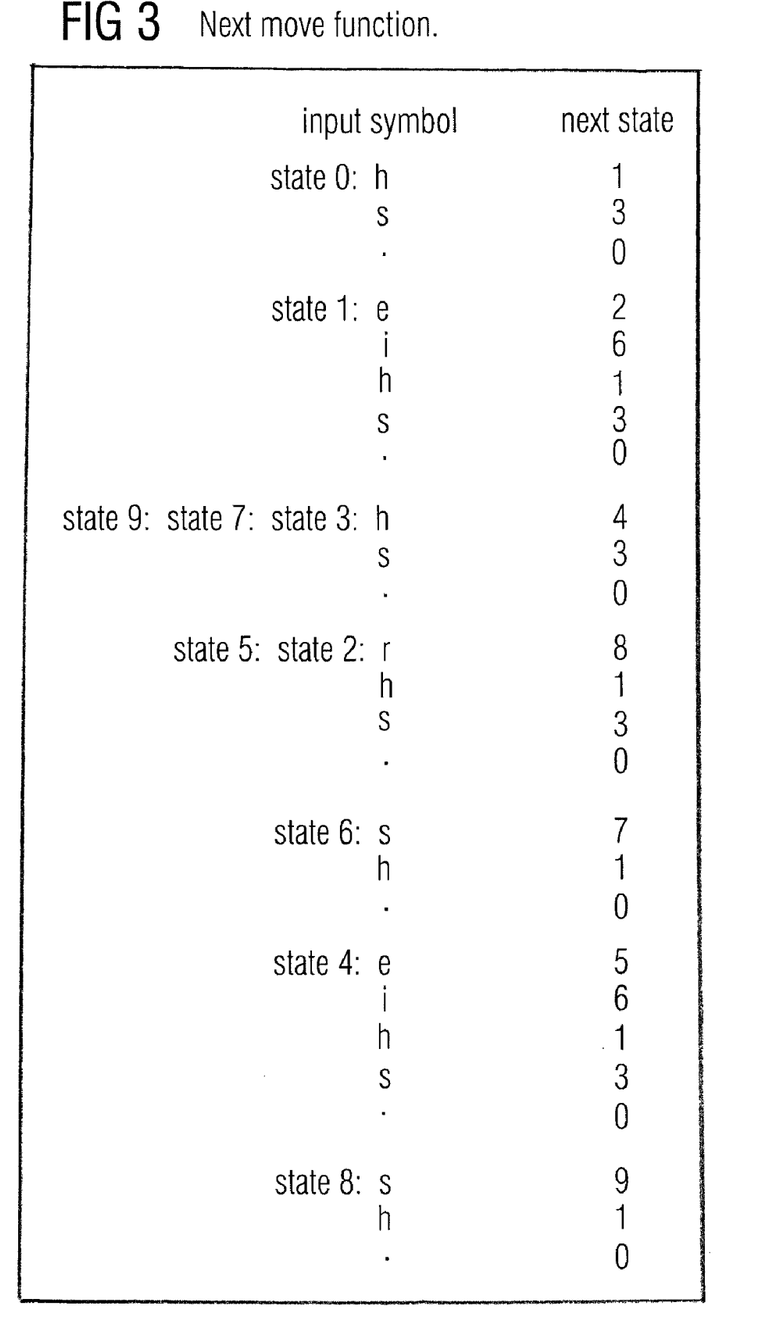
FIG. 3 illustrates encoding of a next move function.

So far we have only discussed the case where there is only one failure link going from a particular node. In a refined version of the Aho-Corasick methodology discussed also in the paper, where there is a failure at a particular node there may be a multiple of failure links depending on the character under consideration. This is best described with reference to figure X which shows a table of the failure links for the same example above. The next move function is encoded in FIG. 3 as follows. In node 0, for example, we have a transition on to state 1, a transition on s to node 3, and a transition on any other character to node 0. In each node, the dot stands for any other character. This refined methodology is referred to hereinafter as extended link methodology, the previous defined as normal failure link. The invention described hereinafter is applicable to both.

One drawback of the known Aho-Corasick terminology, described above, lies in the need to recompile the structure if an update is made. This takes a considerable amount of processing power especially as the known Aho-Corasick methodology has to be built up in "breadth first" i.e. a depth at a time for each string.

SUMMARY OF THE INVENTION

The current application addresses the above problem by defining an algorithm for constructing the automaton in a depth first manner. This is used with a specific realisation of the approach to provide an efficient mechanism to update the automaton without a full recompilation. With the conventional breath first approach to building the extended version of the automaton the addition of a string to the existing structure would require all of the state transitions to be updated. For large keyword sets the computational cost of updating the entire structure is excessive and prevents the structure from being updated whilst online.

The invention comprises a method of constructing an Aho-Corasick tree characterised wherein the tree is constructed in a general depth first manner, one string at a time. Preferably during construction of said string, after each node is added, failure links or extended failure links from that node to other nodes are added and failure links to nodes in the newly inserted branch are re-updated. In a preferred efficient method only those links to the nodes in the new branch which need updating are identified.

Other objects, advantages and novel features of the present invention will become apparent from the following detailed description of the invention when considered in conjunction with the accompanying drawings.

DETAILED DESCRIPTION OF THE INVENTION

For the purposes of clarity the following terminology will be herein. One starts with a non-empty finite set Σ called an alphabet. Elements of this alphabet are called characters. A string over Σ is any finite sequence of characters from Σ. In information processing, a state is the complete set of properties transmitted by an object to an observer via one or more channels. A transition indicates a state change and is described by a condition that would need to be fulfilled to enable the transition. An automaton is a mathematical model for a finite state machine (FSM). An FSM is a machine that, given an input, jumps through a series of states according to a transition function. This transition function tells the automaton which state to go to next given a current state and a current character. An automaton that can be used to recognise the string 'nice' is illustrated in FIG. 4b) below:

In the above example it can be seen that every state with the exception of the start and error states labels a prefix of the string 'nice'. The transitions of the automaton are indicated by the arrows connecting the states. The transition function for the above automaton is as follows; given an arbitrary state and an arbitrary character move to the state pointed to by the transition labeled with said character. For example, if the machine is in the start state and the character is 'n' the state of the machine will change from the start state to the 'n found' state.

In the theory of computation, a deterministic finite state machine or deterministic finite automaton (DFA) is a finite state machine where for each pair of state and input character there is one and only one transition to a next state. A trie is an ordered tree data structure that is used to store an associative array where the keys are strings. A trie can be seen as a deterministic finite state automaton. A suffix trie of a string is a trie representing all the suffixes of that string. In general a state can also be referred to as a node and a transition can be referred to as an edge. The deterministic finite state automaton for the strings 'to', 'tea', 'ten', 'i', 'in', and 'inn' is shown in FIG. 4c.

Figure 4A:
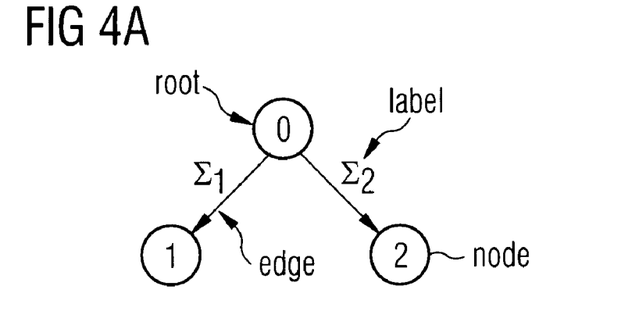
FIG. 4A illustrates a "root" node and two additional nodes for the method according to the invention.
Figure 4B:
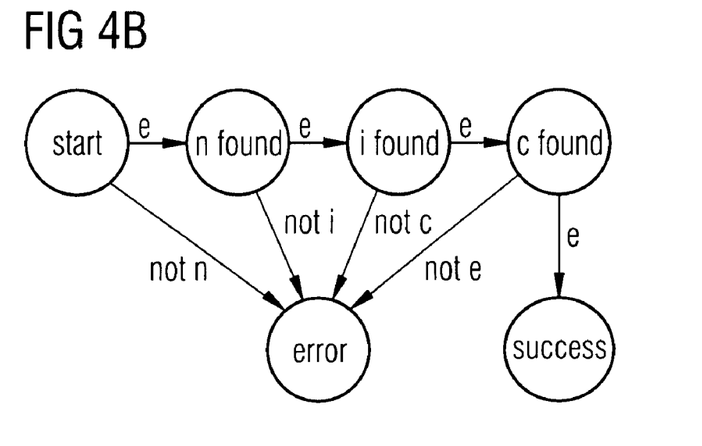
FIG. 4B illustrates an automation that can be used to recognize the string "nice"
Figure 4C:
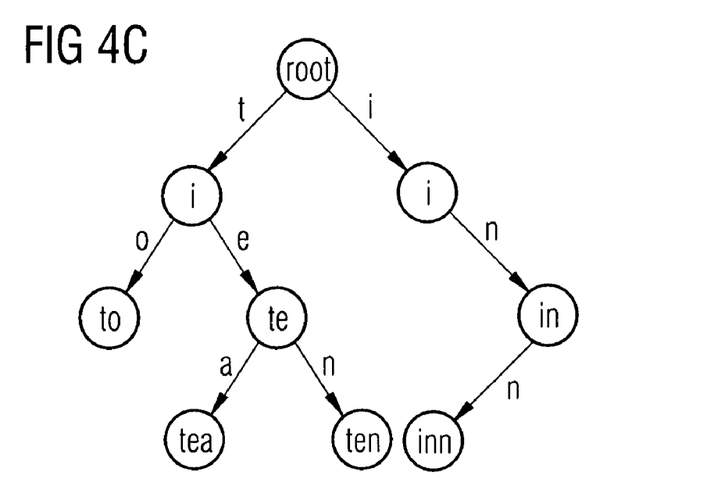
FIG. 4C shows a deterministic finite state automation for the strings "to", "tea", "ten", "i", "in" and "inn"

Within the automaton the start node is commonly referred to as the root, this is shown in the diagram as the uppermost node (see FIG. 4a.) A parent node is a node that is linked via an edge to a deeper node in the figure. For example the node labeled 't' is the parent of the nodes labeled 'to' and 'te'. A child node is a node that is linked to by a parent node. Starting at an arbitrary node each of the nodes edges defines a transition to another node in the trie. In this case each edge in the trie is associated with a character or label. A branch is defined by a series of edges starting at the root. In the remaining text an edge is explicitly used to define a transition that links a parent node with its children. The transition function for the Aho Corasick automaton is as follows; given an arbitrary node and an arbitrary character move to the node pointed to by the edge labeled with said character. If there is no edge labeled with the character then use the failure function to determine the next node. For the Aho Corasick automaton given a current node and the current character the failure function is used to define the state to go to next when the goto function returns fail. A failover node in the automaton is a node returned by the failure function. A failure link is a transition that joins a node to a failover node.

If the failover node does not exist the failure link joins a node to the root node. A failure link is a specialisation of an edge. A failure link is used to define a transition that links a node and its failover node.

Methodology for Depth-Wise Construction of the Aho-Corasick String Matching Automaton with Normal Failure Link The following is a basic methodology according to a simple embodiment of the invention.

To build the tree in depth-wise fashion branches for each string are added one at a time as follows:
a) form the root,
b) starting from the root, take character string and build it depth-wise from the root;
   i) adding a node at a time;
   ii) set up the failure link for the node as follows:
      I) find the longest suffix (including the current character) of the current branch that also a prefix of another or the current branch; if such a prefix exists then set the failure link to that location.
      II) correct any corruption: the insertion of the new node into an existing automaton may corrupt the failure links of the existing nodes in the automaton;
         i) identify which of the existing nodes has been affected by the insertion of the new node;
         ii) find the longest suffix (including the current character) of the current branch that also a prefix of another or the current branch. If such a prefix exists then set the failure link to that location;
c) repeat steps i) and ii) for each node of current string;
d) repeat step b) and c) for each new branch inserted into the automaton.

In other words, the automaton (tree) is built up depth-wise; i.e. a string at a time. This is a fundamental difference between the prior art where the tree is built up breadth-wise; i.e. a level at a time. After the insertion of each node (after the first string has been added) failure links are determined by looking at previous suffixes of the branch that match prefixes of other already inserted branches. Corruption may occur e.g. the current inserted branch may have prefixes which are useful for other failure links from other branches already inserted. This is dealt with.

EXAMPLE 1

Figure 5A:
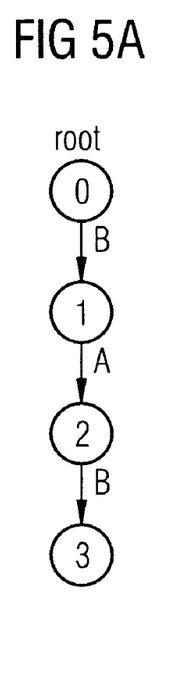
FIGS. 5A-G illustrate the steps performed in a build cycle according to the invention.

The algorithm processes each string x by successively reading the characters in x, and applying the build function b. The build function is used to map a pair consisting of a node and an input character into a node or the message null. FIG. 5a represents the build function. The edge labeled B from 0 to 1 indicates that b(0,B)=1. The absence of an arrow indicates null. Thus, b(1, σ)=null for all input characters σ that are not A. The action of the build function means that the branch is inserted in a depth wise fashion into the automaton. A build cycle is defined as follows, Let s be the current node and a the current character of the string x. The following is an detailed algorithm of the general methodology:
   1. If b(s, a)=s', the algorithm makes a build transition. It enters node s', and the next character of x becomes the current input character. The build cycle is now complete.
   2. If b(s, a)=null,
      a. add a node s' to the automaton
      b. add an edge to s and sets its label to a.
      c. set the edge to reference s'.
      d. set up the failure link for s' as follows: find the longest suffix (including the current character) of the current branch that also a prefix of another or the current branch; if such a prefix exists then set the failure link to that location otherwise set the failure link to the root node;
      e. correct the corruption: the insertion of s' into an existing automaton may corrupt the failure links of the existing nodes in the automaton; the corruption can be corrected in two phases:
         i. identify which of the existing nodes has been affected by the insertion of the new node;

ii. re-apply step d) to each of the affected nodes in a depth first manner as follows:
   1. form a string from the concatenation of the edge labels leading from the root to the corrupt node;
   2. re-apply step d) with the corrupt node taking the role of the current node;
f. enters the node s' and the next character of x becomes the current input character;
g. the build cycle is now complete.

Figure 5B:
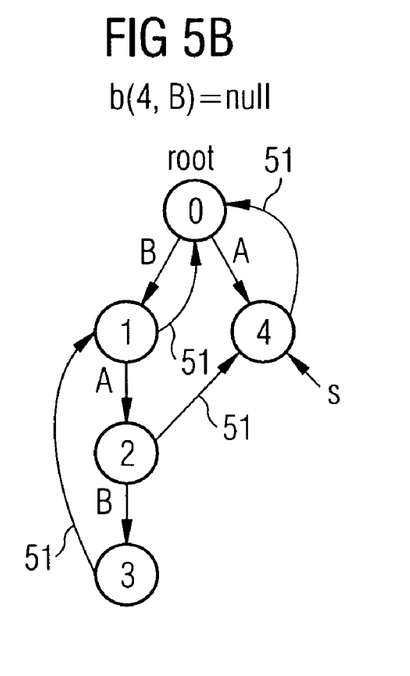
Figure 5C:
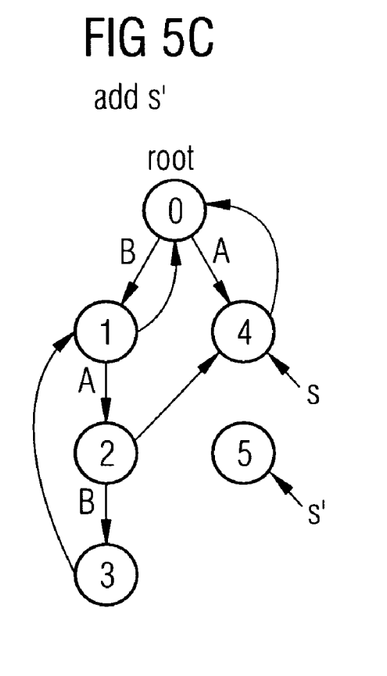
Figure 5D:
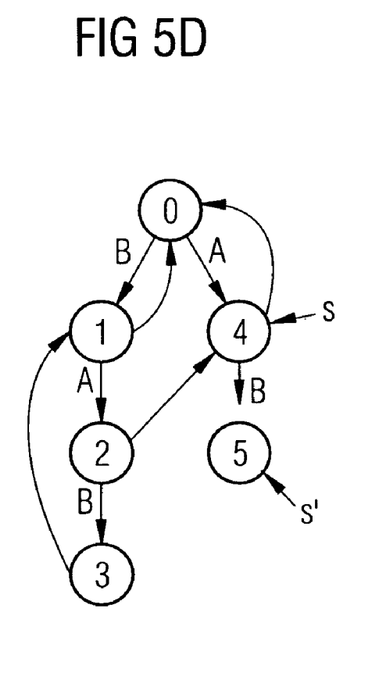
Figure 5E:
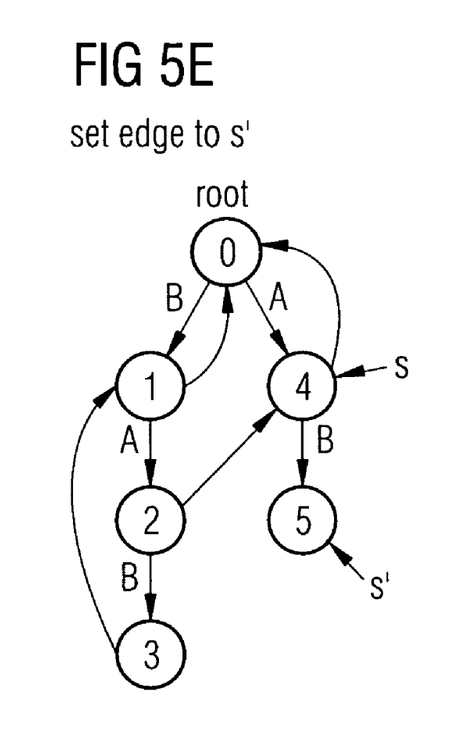
Figure 5F:
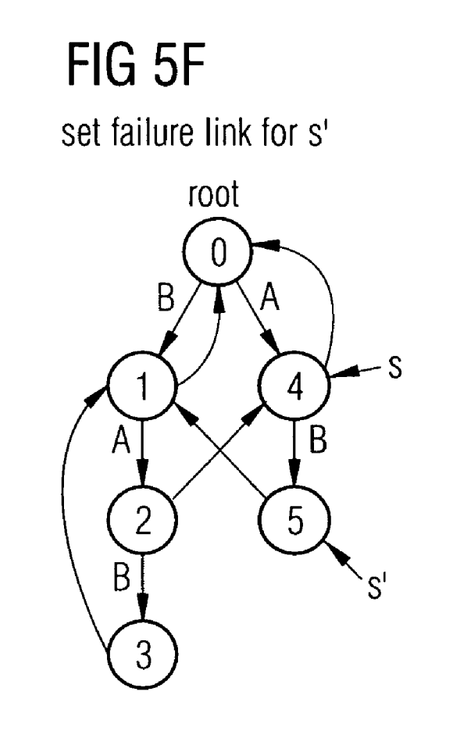
Figure 5G:
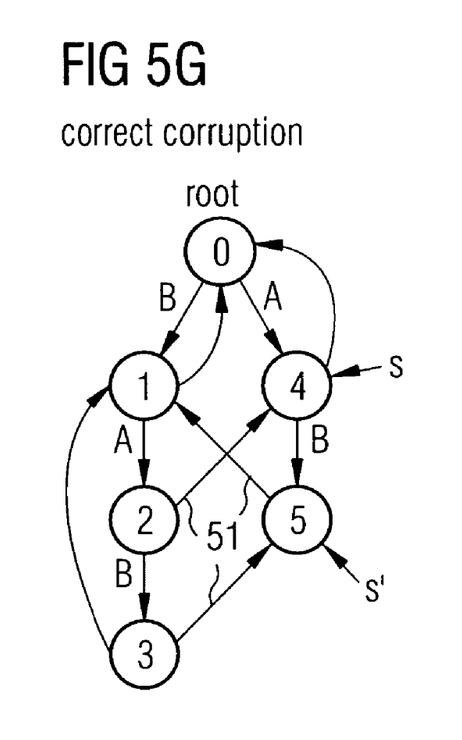
Figure 6A:
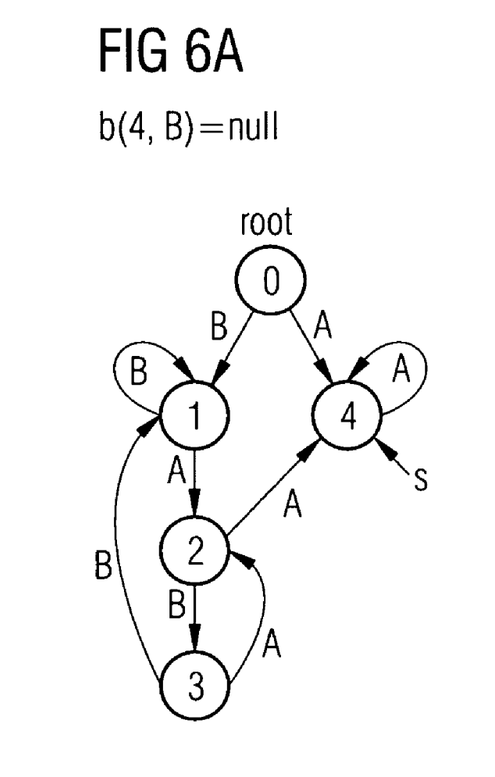
FIGS. 6A-F illustrate the operations performed according to an extended failure link algorithm.
Figure 6B:
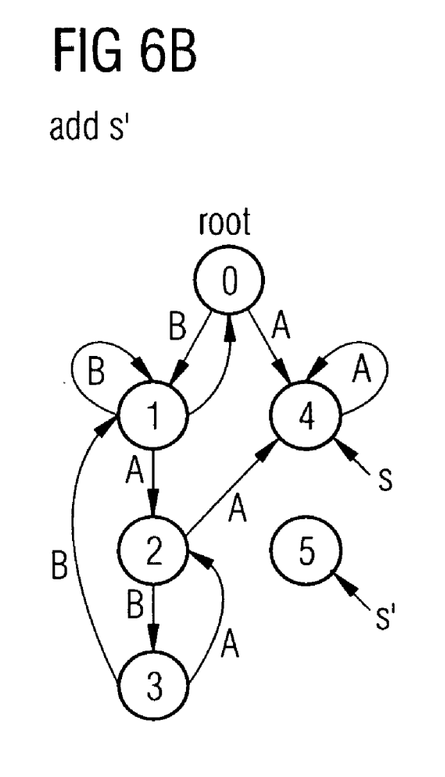
Figure 6C:
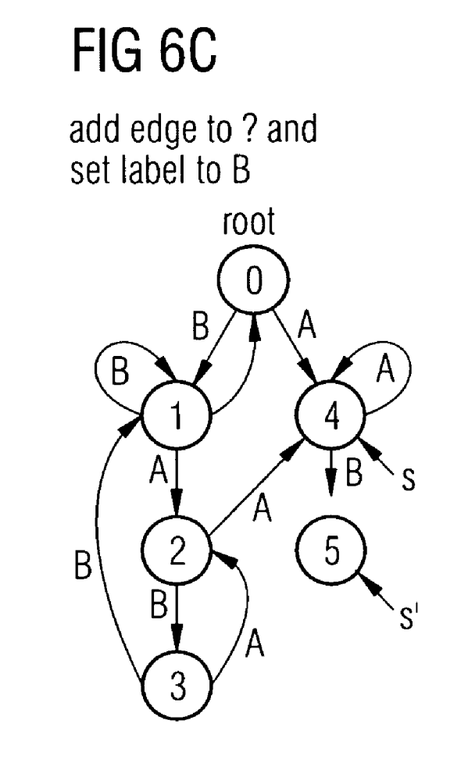
Figure 6D:
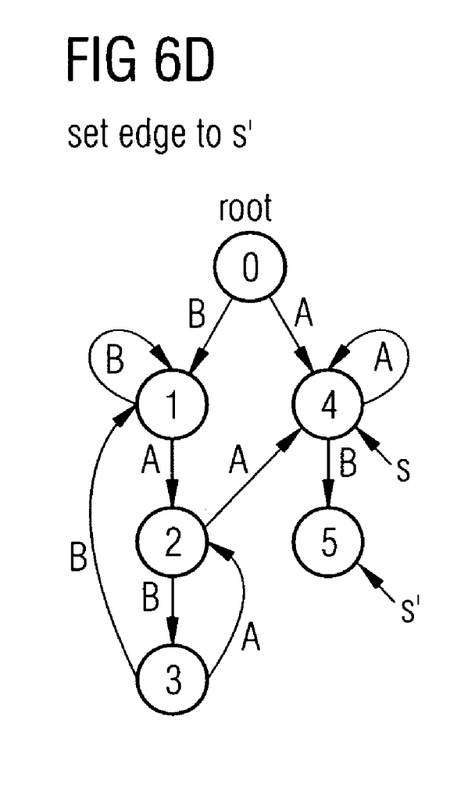
Figure 6E:
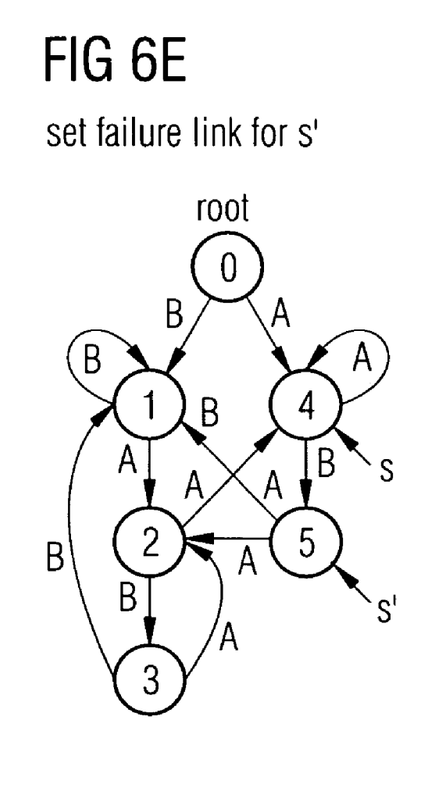
Figure 6F:
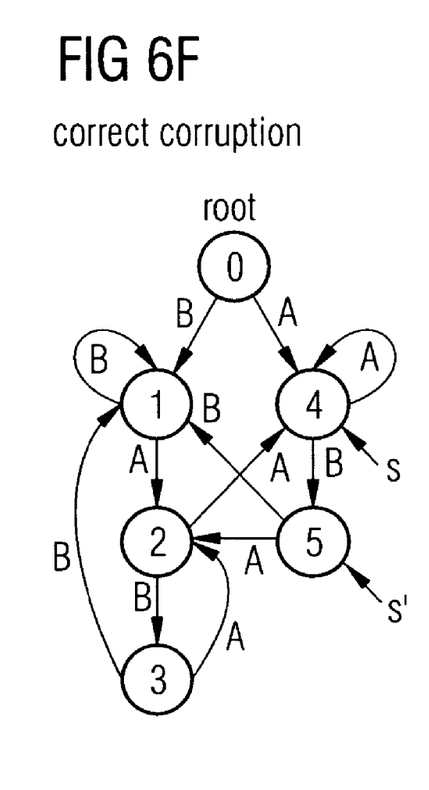

The operations performed in step 2 are illustrated in FIGS. 5b) to g) for the case where the character B of the string AB is inserted, within the figure failure links are shown by reference numeral 51.

Initially, the current node of the algorithm is the root node and the first character of x is the current input character. The machine then processes x by making one build cycle on each character of x. When the final character of x is reached a sentinel node is created to mark the end of the branch.

Repeat the above methodology for each new branch inserted into the automaton.

Step e) can be achieved preferably by a further preferred embodiment described in detail later called the "suffix trie" method.

Methodology for Depth-Wise Construction of the Aho-Corasick String Matching Automata with Extended Failure links.

The extended failure link construction algorithm is identical to that of the normal failure link construction algorithm with the following amendments to step b) ii) of the general algorithm for normal links, such that step b) ii becomes:
   a) set up the failure link for the node as follows:
      i) find the longest suffix of the inserted path that matches a prefix of an existing or the current path (this is the same as step e); if the prefix exists, then for each edge emerging from the node that represents the prefix, create a corresponding edge in the inserted node that leads to the same destination.
      ii) take the next shortest suffix and repeat the previous step taking care not to overwrite any that were created in the previous step.
      iii) continue until all the suffixes have been exhausted including the empty suffix;
   b) correct the corruption: the insertion of the new node into an existing automaton may corrupt the failure links of the existing nodes in the automaton; the corruption can be corrected in two phases:
      i) identify which of the existing nodes has been affected by the insertion of the new node;
      ii) re-apply the step a) to each of the affected nodes in a depth first manner by forming a string from the concatenation of the edge labels leading from the root to one of the corrupt nodes;
      iii) re-apply step a) with the corrupt node taking the role of the current node.
      iv) however, in this case an additional constraint exists: if there is already an edge emerging from the corrupt node that is labeled with the same character as one of the edges emerging from the prefix node then if said edge leads to a child of the corrupt node do not overwrite it, otherwise set the edge to point at the destination referenced from the prefix node.

EXAMPLE 2

The detailed extended failure link construction algorithm is identical to that of the normal failure link construction algorithm with the following amendments to step d) and e):

b) i) set up the failure link for the node as follows:
      ii) find the longest suffix of the inserted path that matches a prefix of an existing or the current path (this is the same as step e); if the prefix exists, then for each edge emerging from the node that represents the prefix, create a failure link labeled with the same character in s' that leads to the same destination.
      iii) take the next shortest suffix and repeat the previous step taking care not to overwrite any failure links that were created in the previous step.
      iv) continue until all the suffixes have been exhausted including the empty suffix.
   c) correct the corruption: the insertion of s' into an existing automaton may corrupt the failure links of the existing nodes in the automaton:
      i) identify which of the existing nodes has been affected by the insertion of the new node;
      ii) re-apply the step a) to each of the affected nodes in a depth first manner by forming a string from the concatenation of the edge labels leading from the root to one of the corrupt nodes and.
      iii) re-applying step a) with the corrupt node taking the role of the current node;
      iv) however, in this case an additional constraint exists: if the corrupt node contains and edge that is labeled with the same character as one of the edges contained in the prefix node then if said edge leads to a child of the corrupt node do not create a failure link for it. Otherwise set the failure link labeled with the same character in the corrupt node to the same destination referenced from the prefix node.

The operations performed are illustrated in FIG. 6 for the case where the character B of the string AB is inserted, with the figure failure links are shown by reference numeral 61. Note in this case the insertion of the new node does not corrupt the failure links of the existing nodes.

Preferred Embodiment—Use of Suffix Trie to Update Corrupted Links

To insert a new branch into an automaton the algorithm must map the suffixes of the new branch to the prefixes of the existing branches. Then to remove the corruption in the existing branches, the algorithm must map the suffixes of the existing branches to the prefixes of the new branch.

The mapping of the new branch to the existing branches can be performed as the nodes for the new branch are inserted. Thus, once a new branch is created the algorithm needs to find the suffixes of the existing branches that map to a prefix of the latest branch. This can be achieved by forming a suffix trie from the previous branches. The suffix trie is then searched using the inserted branch. The search in the suffix trie can be used to identify the affected nodes in both the normal and extended cases.

Figure 7A:
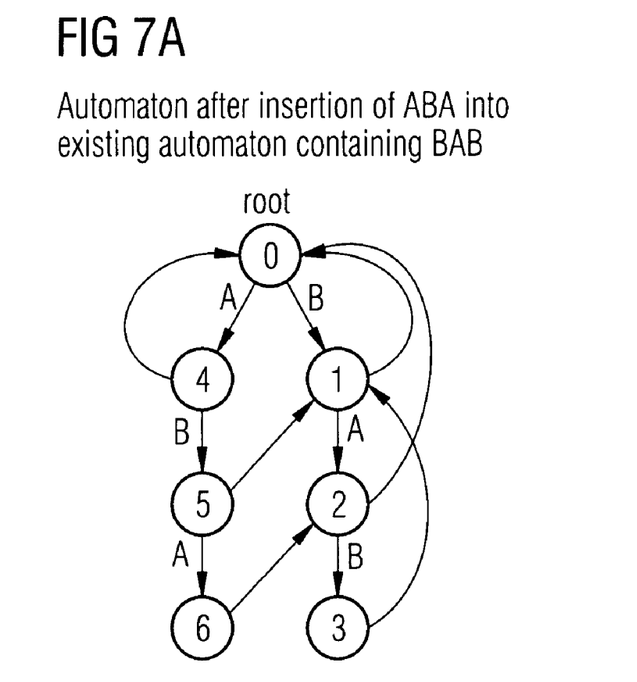
FIGS. 7A and B illustrate a preferred embodiment of the suffix trie method to update corrupted lens.
Figure 7B:
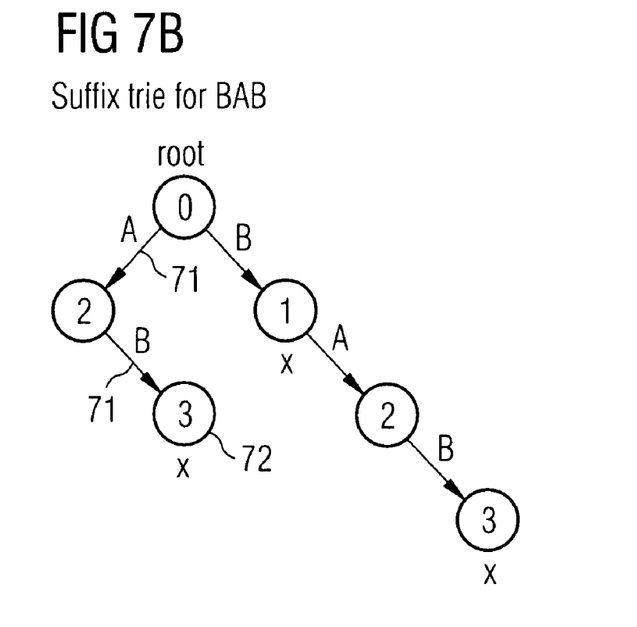

FIG. 7a shows an example where the normal automaton for the strings BAB and ABA after inserting the string ABA into an existing normal automaton containing the branch BAB is shown below. FIG. 7b shows the suffix trie for the existing branch BAB before the branch ABA was added. For the suffix trie the nodes marked with the letter x are suffixes of the branch BAB.

After adding the branch ABA the algorithm can determine the nodes that need updating by searching the suffix trie with the string ABA. In the above case the search would follow the path in the suffix trie denoted by reference numeral 71 and would terminate on node 72. The search indicates that the suffix AB from BAB matches the prefix AB from ABA. Thus, the nodes in the suffix trie leading to the node 72 are the ones that need to be updated to remove the corruption.

To facilitate the algorithm the suffix trie must be constructed as the structure is built. Thus, after inserting a branch the set of suffixes for that string would be added to the suffix trie to be used in latter updates. Note this methodology can be used on a per branch or a per node basis. For the per node basis the suffix trie is traversed at the same time as traversing the automaton.

Further Improved Embodiment to be Used with the Suffix Trie Method—"Edge Index"

In yet a preferred embodiment (when using the suffix trie method), an even more efficient way of setting up normal and extended failure links in the invention utilises "edge index"

Construction of the suffix trie is computationally expensive and consumes a significant amount of memory. The search on the suffix trie essentially provides the location of nodes 2 and 3. However, given the inserted branch, node 3 can be found using only the location of node 2. Node 3 can be found by simply traversing the existing normal automaton using the inserted branch to select which edge to follow out of node 2. The traversal continues until either the inserted branch is exhausted or when a valid edge out of the current node labeled with the next character from the inserted branch does not exist. With this simplification, as long as the location of node 2 is known the location of the corrupted nodes can be determined using only node 2 and the inserted branch.

The property of import of node 2 is that the edge leading to node 2 has the same label as the first character of the inserted branch. That is the edge leading to node 2 is a single character prefix of the inserted branch. Each node in the tree has the potential to be the single character prefix of any branch subsequently inserted into the normal automaton.

Figure 8A:
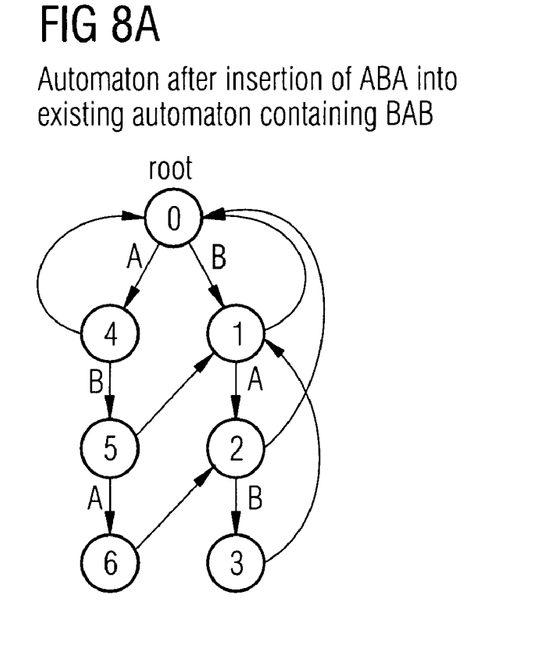
FIGS. 8A and B illustrate the edge index for the alphabet $C_A$, B] for the branch BAB in a preferred embodiment which uses edge index construction of the suffix trie.
Figure 8B:
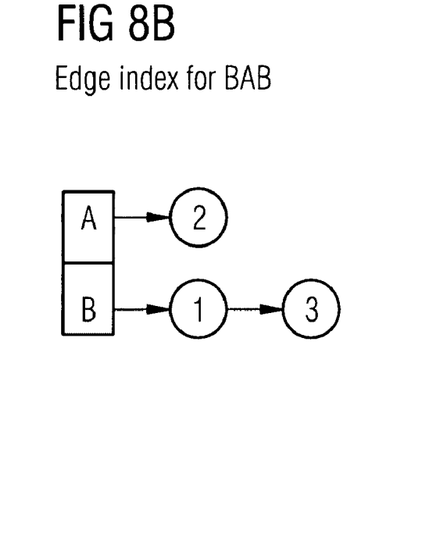

Consequently, the location of all of the single character prefixes can be recorded as the automaton is built by creating an edge index which records the location of the nodes reached by all of the edges in the automaton. The set of edges associated with the first character of each string inserted into the automaton can be efficiently retrieved if the edge index is sorted according to the alphabet of the automaton. The edge index for the alphabet [A, B] is illustrated in FIG. 8 for the branch BAB.

The location of the start of the paths that need to be updated can now be found simply by looking up the first character of the inserted branch in the edge index. The nodes referenced by the edge index are the locations of the start nodes of each of the suffixes in the existing branches that form a prefix of the new branch. The update process starts at the indexed location and then traverses the automaton along an existing branch until the algorithm either runs out of characters for the inserted branch or an edge leading out of a node in the automaton labeled with the current branch character does not exist. The update process is performed for each item in edge index list referenced with the initial character of the inserted branch. The items in the individual lists are accessed in depth first order. For each of the nodes along an update path the failure links are updated using the failure link algorithms discussed previously.

Further Improved Embodiment to be Used with the Suffix Trie Method—"Suffix List Method"

Figure 9:
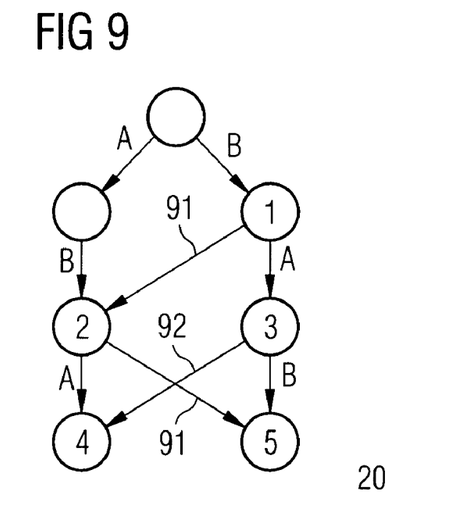
FIG. 9 shows an example of a suffix list.

The identification of the corrupted nodes can also be achieved by using a suffix list. Within each node of the automaton we create a list of suffixes that match the prefix formed by the path up to the current node (inclusive). An example of the suffix list is shown in FIG. 9.

The suffix list for the node reach by following the edge labeled B out of the root is shown by reference numeral 91. The suffix list for the node reached by following the edges B then A is shown by reference numeral 92. In general the nodes that could potentially be affected by the insertion of a new node are the children of the nodes that lie along the suffix list of the inserted nodes parent. Thus, the corrupt nodes can be found by simply following the suffix list and determining which children are affected. The affected children are those whose edge label matches that of the inserted node. For example, the suffix list is used to identify potentially corrupt nodes as follows:

Consider node 3: when node 3 is inserted its presence may modify the failure link of node 4. Node 4 can be found by moving to the parent of node 3 (node 1) and following the first link in the suffix list to node 2. We then examine the edge label at node 2 and discover that the label matches the edge label leading to node 3. Consequently a suffix matching the prefix defined by node 3 exists at node 4. The failure link at node 4 can then be updated by re-applying step d.

In general for the normal automaton when a node is inserted the following steps are performed:
  a) first set the failure link of the inserted node.
  b) then move to the parent of the inserted node and follow its suffix list;
  c) for each node on the suffix list determine whether there is an edge whose label matches that of the edge leading to the inserted node.
  d) if there is a match then re-apply the failure link algorithm to the node pointed to by the edge.

For the extended automaton the procedure is identical with the exception that we apply extended case failure link algorithm. In this case the suffix lists must be constructed as the data structure is built. However, as we are always using the parents suffix list we can be sure that it is up to date when inserting the new node.

Preferred Embodiment—Use of a Base Automaton to Speed up Online Insertion

Figure 10A:
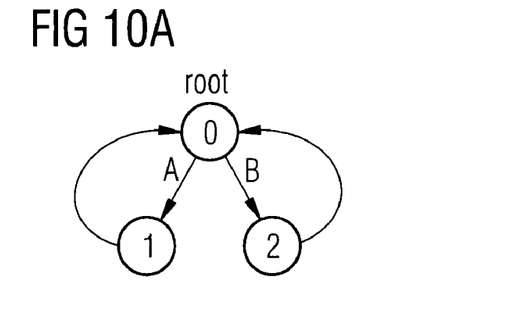
FIGS. 10A and B show an initialized normal and extended automation for the alphabet [A,B]

Within the normal automaton most of the failure links simply lead back to the root of the automaton. Within the extended automaton a link is created for each character in the automatons alphabet. However, in this case most of the failure links lead back to the set of states reached by following the edges out of the root. In both cases it can be seen that much of the effort used to construct the data structure is spent in setting the failure links to the states described above. This can prove to be a considerable overhead when updating the automata at runtime. Much of the effort used in constructing the automaton can be saved by assuming that the failure link leads to the initial state. This assumption is then only corrected by computing the correct destination during the build process. This effort can be avoided at runtime by creating a base automaton and a pool of nodes whose failure links are pre-configured offline. The base automaton contains the initial characters of all possible strings that can be created with the alphabet used for the set of strings. The base automatons consist of a root node, a set of nodes and a set of edges. For each character contained in each automatons alphabet an edge is created which links the root node to a non terminal node that represents the prefix formed by following the branch from the root labeled by each individual character of the automatons alphabet. In the case of the normal automaton each node may have multiple edges that lead to other nodes on a branch and a single failure link. For the extended case each node may have multiple edges and multiple failure links. Between them the edges and failure links of the extended automaton will cover the alphabet of the automaton. Both the normal and extended the automata are pre-configured to a depth of one. For the alphabet [A, B] the initialised normal automaton is shown in FIG. 10a.

Figure 10B:
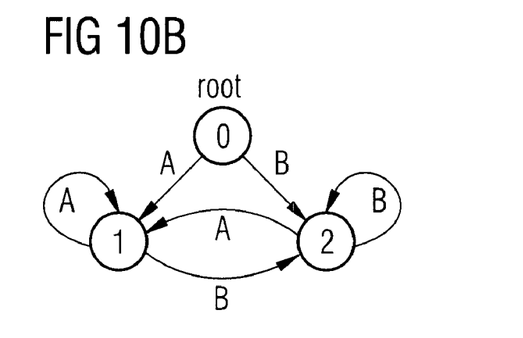

The extended base automaton is also initialised by setting up all the links for the first level of the data structure. For example the alphabet [A, B] the initialised extended automaton is shown in FIG. 10b. The set of nodes formed by nodes 1 and 2 are called the base nodes.

A pool of states is then created which are all pre-configured with links to the states of the base automaton. This pool of states is held on a stack which can be accessed at any point during the life of the automaton. If necessary the stack can grow and shrink with the memory requirements of the automaton. These states are then used to build the overall structure. When a new string is inserted there is no longer any need to link the states back to the initial states. When constructing the trie these pre-configured links are simply overwritten with the links that lead along the path being inserted into the trie. The automaton is then constructed by inserting the strings into the structure in a depth first manner.

EXAMPLE 3

Figure 11A:
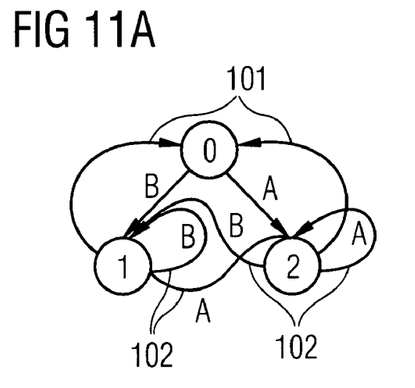
FIGS. 11A-D illustrate the determination of failure links.
Figure 11B:
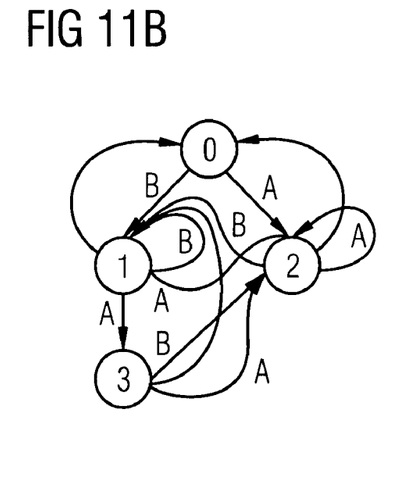
Figure 11C:
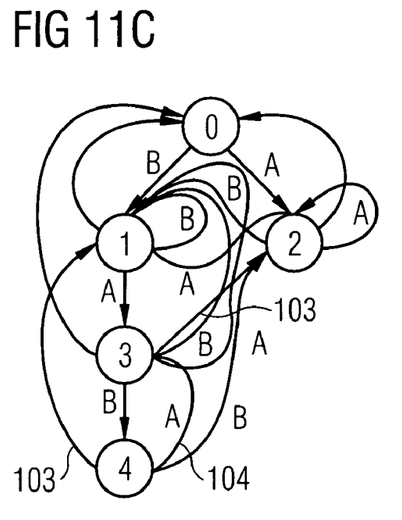
Figure 11D:
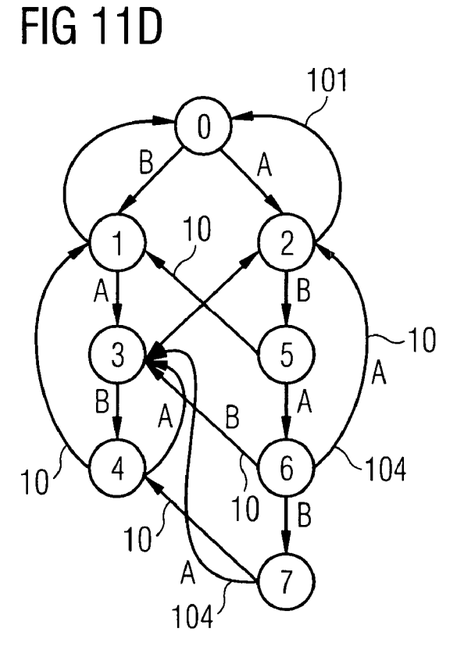

As can be seen the base automaton shown in FIG. 11a consists of the states 0, 1 and 2 that are used to represent the alphabet. For each of the states the relationships established earlier are used to determine both the failure links and the extended failure links. Note both of these are pre-computed for the base automaton. Both sets of links are required so that the links for subsequent strings can be calculated. The pre-computed failure links are shown by reference numeral 101 and the pre-computed extended failure links are shown by reference numeral 102. For each string inserted we begin the insertion by adding nodes to the end of the appropriate pre-computed path in the base automaton. For each character of the string being added to the automaton we apply the previous algorithms to calculate the failure links and the extended failure links. This process continues until the string is exhausted. As described previously there is no need to insert the failure links or extended failure links for the pre-computed nodes. However, if a state is found for which the failure link does not lead to the root or the extended failure link does not lead to a state in the set Q, the link is overwritten with a reference to the correct state. This is the case for state 4 where the re-routed failure link is shown by reference numeral 103 and the re-routed extended failure link is shown by reference numeral 104. A similar process is used to insert subsequent strings. The state of the automaton after the insertion of the string ABAB is shown below, where for clarity the extended failure links have been omitted. Note these links were created during the pre-computation stage. As can be seen the action of the build process described so far successfully maps the inserted string onto the existing set of strings. However, in its current form some of the failure links and extended failure links have become corrupt. As can be seen the failure link for state 4 should now point at state 5 and the extended failure link for state 4 labeled by 'A' should now point at state 6. This corruption can be fixed by re-applying the failure link and extended failure link algorithms to every node in the automaton. This would require a complete breath first traversal of the automaton which would essentially recompile the stricture. However, the cost of performing this operation on a large automaton is likely to be excessive.

An alternative approach and the approach used in the current algorithm is to simply update the subset of states affected by the insertion of the new string. In order to do this we must be able to determine which nodes these are based on the string being inserted. This can be done with the aid of a suffix trie. The failure function makes a connection between the longest suffix of one path through the tree and the longest prefix of another. Consequently, to update the set of existing strings we must find all of the suffixes of the existing strings that form a prefix of the new string.

In practice this can be achieved by creating a suffix trie of prefixes for the existing set of strings. A suffix trie of prefixes contains the set of suffixes formed by taking successive prefixes of a string e.g. for the string ABAB the set of prefixes are A, AB, ABA, ABAB. Thus, the set of suffixes of the prefixes of ABAB are:

| A | NULL |
| AB | B NULL |
| ABA | BA A NULL |
| ABAB | BAB AB B NULL |

To find the set of nodes that need to be updated we simply search the suffix trie to find the set of states which form a prefix of the string being inserted. Thus, if the inserted string is BAB, the valid suffixes are B, BA and BAB. Within the suffix trie a reference is created to each of the nodes in the trie. These references are then used to find the states that require updating. The failure link and extended failure link algorithms are then reapplied at these states which correctly updates the affected states without the need to recompile the entire automaton.

Thus, the combination of the pre-computed links to the states in the set, Q, and the mechanism for finding the subset of states that need to be recompiled allows the automaton to be updated without rebuilding the entire data structure. The suffix trie of prefixes formed from the existing states can be simplified as we only need to know the location of the first character of each suffix to enable the update of the subsequent nodes. The subsequent states can be found by simply following the success transitions in the trie until there is a mismatch between the path in the trie and a character in the new string. Consequently, the structure can be updated by forming a state reference table in which we store a reference to each of the shortest possible suffixes of the prefixes of a string. For the example above the shortest suffixes of the prefixes of ABAB are A, B, A and B.

This amounts to creating a table to store a reference to the location of each character in the trie. When a new string is inserted the first character in the string is used to look up the list of states which can be reached by following a success transition labeled with that character from another state. For each item in this list the failure link and extended failure link algorithms are then reapplied while there is a match between the string being inserted and the success path through the trie. The use of this table effectively compresses the suffix trie to the minimum number of nodes required to make the updates. The simplicity of the table also means that it can be easily constructed as the existing trie structure is built.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of searching a text to locate occurrences of user specified patterns of words or phrases comprising character strings, said method comprising:

receiving an input comprising user specified patterns that are to be searched for;

based on said user specified patterns, constructing a finite state pattern matching machine that includes an Aho- Corasick tree having branches that comprise nodes connected by paths, go to links and failure links;

processing the text according to said finite state pattern matching machine to locate matches to the user specified patterns; and said state pattern matching machine outputting locations in said text string where said specified patterns appear; wherein, said finite state pattern matching machine is constructed first in a general depth first manner, for each path comprising links representing a single user specified pattern;

said step of constructing said Aho-Corasick tree in said finite state pattern matching machine comprises a) forming a root;

b) starting from the root, building a series of nodes, paths and links that corresponds to a specified pattern comprising a character string, said building being performed depth-wise from the root by i) adding a node at a time;

ii) setting up a failure link for the node as follows,

I) finding a longest suffix, including a current character, of a current branch that is also a prefix of another or the current branch, and if such a prefix exists, then setting the failure link to that location;

II) correcting any corruption by, i) identifying which of the existing nodes has been affected by insertion of a new node;

ii) finding the longest suffix, including the current character, of the current branch that is also a prefix of another or the current branch, and if such a prefix exists, then setting the failure link to that location;

c) repeating steps i) and ii) for each node of a current string;

d) repeating steps b) and c) for each new string inserted into the finite state pattern matching machine;

step b) ii) I) comprises, s) finding the longest suffix of a newly inserted branch that matches a prefix of an existing or the current branch, and if the prefix exists, then for each path emerging from a node that represents the prefix, creating a corresponding path from the inserted node that leads to the same destination;

t) taking the next shortest suffix and repeat the step s), but not overwriting any that were created in the previous step; and u) continuing until all the suffixes have been exhausted including an empty suffix; and step b) ii) II comprises, v) identifying existing nodes which have been affected by the insertion of the new node;

w) reapplying the steps s), t) and u) to each of the affected nodes in a depth first manner by forming a string from a concatenation of path labels leading from the root to a corrupt nodes;

x) reapplying steps s) t) and u) with the corrupt node taking the role of a current node; and y) if there is already a path emerging from the corrupt node that is labeled with the same character as one of the paths emerging from the prefix node, then if said path leads to a child of the corrupt node do not overwrite it, and otherwise setting the path to point at the destination referenced from the node that represents the prefix.

2. The method as claimed in claim 1, wherein during construction of said finite state pattern matching machine, after a node is added, failure links or extended failure links from that node to other nodes are added.

3. The method as claimed in claim 1, further comprising the step of creating a base automaton after step a) having preconfigured failure links.

4. The method as claimed in claim 1, using a suffix tree in one or more steps.

5. The method as claimed in claim 1, using a suffix list in one or more steps.

6. The method as claimed in claim 1, using a path index in one or more steps.

\* \* \* \* \*